United States Patent
Corbin et al.

(10) Patent No.: US 6,236,919 B1
(45) Date of Patent: May 22, 2001

(54) METHOD AND APPARATUS PROVIDING OPERATION OF AN INTEGRATION HUB FOR AUTOMOTIVE SIGNALS DURING LOW VOLTAGE CONDITIONS

(75) Inventors: Bradley Jerome Corbin, Flat Rock; Jeffrey Todd Kanoza, Troy, both of MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/415,842

(22) Filed: Oct. 12, 1999

(51) Int. Cl.$^7$ .................................................. G06F 19/00
(52) U.S. Cl. .............................................. 701/36; 701/35
(58) Field of Search ................................ 701/36, 32, 29, 701/34, 35, 45; 340/437, 441, 146.2, 438, 660, 664; 702/58, 64; 324/76.11

(56) References Cited

U.S. PATENT DOCUMENTS

| | | | |
|---|---|---|---|
| 4,374,333 | 2/1983 | Avery | 307/309 |
| 5,243,324 | 9/1993 | Bober | 340/439 |
| 5,527,187 | 6/1996 | Jurasek et al. | 439/24.7 |
| 5,844,473 | * 12/1998 | Kaman | 701/35 |
| 5,857,159 | * 1/1999 | Pickrell | 701/35 |
| 5,880,568 | * 3/1999 | Bederna et al. | 701/35 |
| 5,968,100 | * 10/1999 | Kayano et al. | 701/36 |
| 6,138,059 | * 10/2000 | Ozeki et al. | 701/32 |

* cited by examiner

*Primary Examiner*—Richard M. Camby
(74) *Attorney, Agent, or Firm*—Quarles & Brady LLP

(57) ABSTRACT

A signal integration hub for automotive sensors measures battery voltage and provides an indication of that voltage to a processing microcontroller. A program executed on the microcontroller distinguishes between convenience and required function sensors and input circuits. When battery voltage is low, the microprocessor substitutes only for the convenience sensors their last debounced value during a time when battery voltage was not low. Inputs from required function sensors are not altered.

14 Claims, 3 Drawing Sheets

METHOD AND APPARATUS PROVIDING OPERATION OF AN INTEGRATION HUB FOR AUTOMOTIVE SIGNALS DURING LOW VOLTAGE CONDITIONS

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to electronic circuits for use in automobiles and in particular, to an apparatus and method for processing automotive electronic signals during periods of low system voltage.

In recent years, the number of electronic signals in an automobile has increased dramatically. This large number of signals is managed through the use of signal integration hubs having connectors for receiving conductors from a wide variety of sensors and actuators, and a microprocessor for processing such signals. The automobile instrument cluster is one site used as a signal integration hub because a large number of actuators, such as electronic gauges, lamps and chimes that are found there and because it is in a protected location in the instrument panel near the engine compartment. Other locations for signal integration hub locations are also possible.

While starting the automobile engine or at other times of high current demand, the standard system voltage of approximately twelve volts may drop. A low system voltage may affect digital input circuits and the output of automotive sensors that rely on this voltage as an implicit reference. In these input circuits and sensors as the system voltage drops, the state of the digital input or the output from the sensor may change. System voltage induced changes may be interpreted by a microcontroller at the signal integration hub as a change of state in the sensed quantity and may result in the erroneous control of actuators.

The electronic signals in an automobile may be divided loosely into "convenience signals" intended to enhance or simplify the operation of the automobile or make its use more enjoyable, and "required function signals" associated with safety or legally mandated equipment. Whereas the convenience signals may tolerate momentary interruption during low system voltage conditions, the required function signals are less accommodating of interruption and are designed to operate even at low system voltages.

Normally, the cost of providing error-free low-voltage operation is not justified for convenience signals. Nevertheless, because both convenience and required function signals are typically mixed at a single integration hub, manufacturers face the prospect of either providing low voltage compensation circuitry for all types of signals, or accepting occasional erroneous signals from unprotected convenience signals during periods of low system voltage. These spurious signals may produce harmless but false activations of chimes, bulbs, gauges and the like.

BRIEF SUMMARY OF THE INVENTION

The present inventors have recognized that the microcontroller at the integration hub may be enlisted to distinguish between convenience and required function signals and to lock the former against changes during periods of low system voltage without the need for additional circuitry. The microprocessor may monitor the system voltage to detect low system voltage. By "locking" signals from convenience sensors or their input circuits during periods of low system voltage, the last legitimate value of those signals is preserved.

Specifically, the present invention provides an integration hub having connections receiving sensor signals and electrical power from an automotive battery/charger system. A voltage sensor communicates with the connection to the electrical power to provide a measure of the voltage of the electrical power to the sensors. Generally that measure may be a digitized analog value or a single digital bit indicating the relative magnitudes of the voltage and a threshold. A microcontroller evaluates the measure of a voltage to determine whether the voltage is above a predetermined threshold and when it is, employs the sensor signals for control functions and stores the values of the sensor signals. When the measure of the voltage is not above the predetermined threshold, the microcontroller employs the stored values of the previous sensor signals for the control functions.

Thus it is one object of the invention to reduce the effect of erroneous signals from sensors or their input circuits caused by low voltage conditions. Implicit in the present invention is the recognition that the true value of the sensor is likely to be its last value prior to the low voltage condition.

It is another object of the invention to provide a method of reducing the effect of an erroneous signal that may be implemented in a microcontroller without the cost of additional circuitry and yet which may be applied selectively to convenience signals and not to required function signals.

The microcontroller may "debounce" the sensor signals prior to using them for control functions or storing their values. Bounce refers to a condition of a fluctuating state occurring immediately after a change of state of a sensor, typically but not always, associated with mechanical vibration in a set of making and breaking contacts. The debouncing may obtain periodic samples of the sensor signals and test for a predetermined number of successor samples of a consistent value.

Thus it is another object of the invention to provide a system that may be readily integrated with conventional debounce techniques and algorithms.

The microcontroller may initialize the stored values of the sensor signals to predetermined values. The predetermined values may be ones which minimize false actuations under most circumstances.

Thus it is another object of the invention to provide effectively two estimates of the state of signals from convenience sensors that may be used during low system voltage conditions, one estimate based on the last measure of the signal and one default estimate when no measure has yet been determined based on a default signal.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

DETAILED DESCRIPTION OF THE INVENTION

Figure 1:
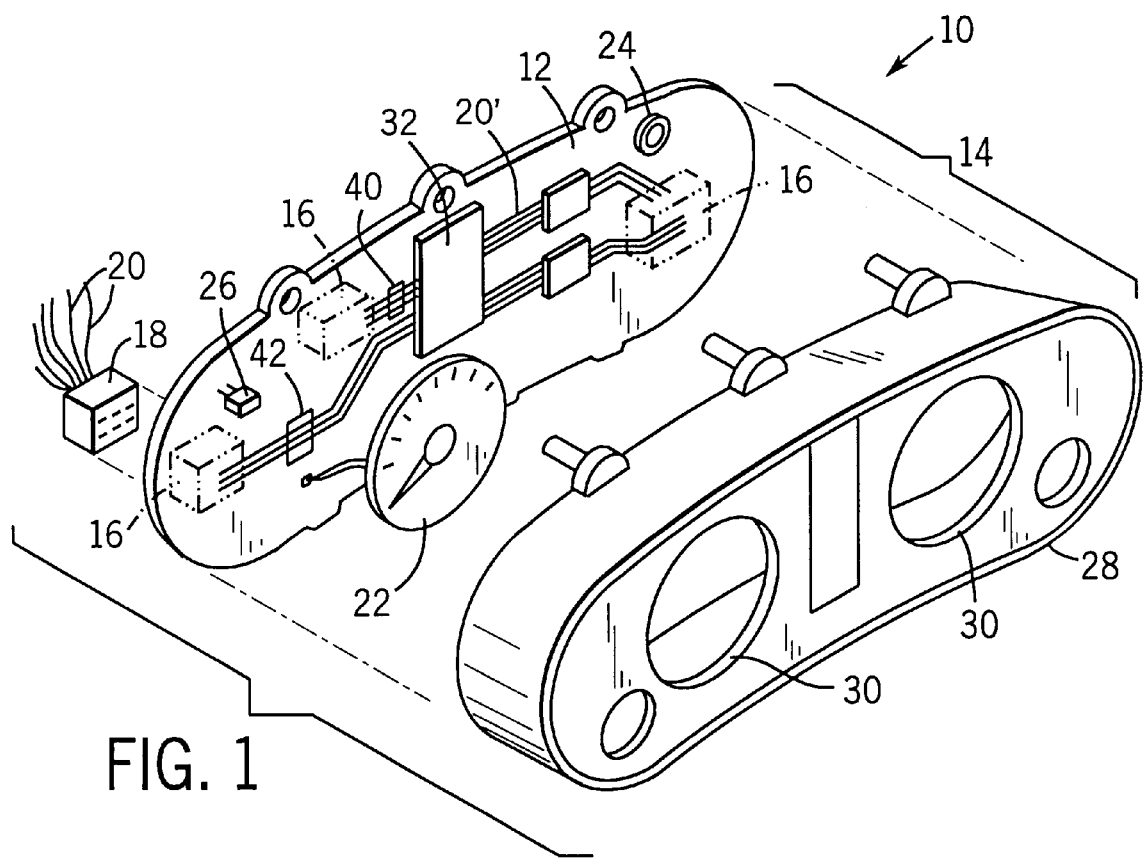
FIG. 1 is an exploded perspective view of an instrument cluster and its associated printed circuit board used as a signal integration hub.

Referring now to FIG. 1, a signal integration hub 10 may be provided on a printed circuit board 12 such as forms a part of the vehicle instrument cluster 14. The printed circuit board 12 may be supported behind an instrument cluster cowling 28 having apertures 30 for receiving and displaying gauges 22 and lamps 26.

Figure 2:
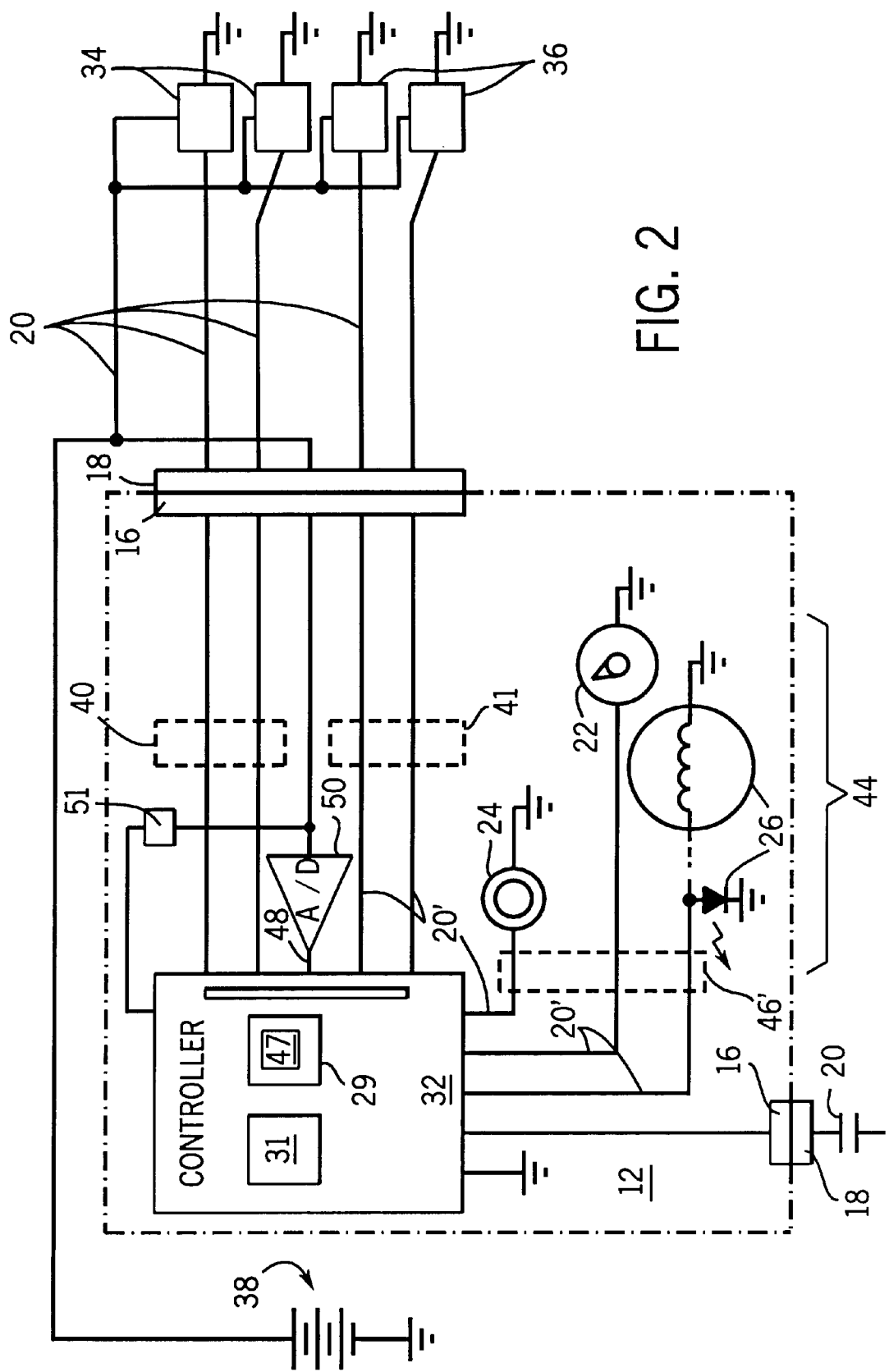
FIG. 2 is a schematic diagram of the circuitry of the integration hub of FIG. 1 showing a microcontroller with input circuits receiving signals from various convenience and required function sensors to provide control signals to various actuators.

Referring to FIG. 2, the printed circuit board 12 may include a microcontroller 32 communicating via circuit traces 20' with various actuators 44 including vehicle gauges 22, electronic chimes 24, and lamps 26 which may be mounted on and connected directly to the printed circuit board 12. The microcontroller 32 may also communicate with convenience sensors 34 and required function 36 located off of the printed circuit board 12. These sensors 34 and 36 are attached to the microcontroller 32 via conductors 20 attached to connectors 18 received by corresponding connectors 16 on the printed circuit board 12. The signals from convenience sensors 34 and required function sensors 36 may pass through input circuits 40, prior to being received by the microcontroller 32, providing battery voltage reference, basic filtering or voltage clamping such as is well known in the art.

The microcontroller 32 generally includes a microprocessor 31 and associated memory 29 and may include various other components such as oscillators, timers, multiplexers input circuits and A to D converters and D to A converters such as allow it to receive and process various electrical input signals from the convenience sensors 34 and required function sensors 36 and to generate output signals to the actuators 44. Microcontrollers suitable for this purpose are commercially available from a number of suppliers.

Once received by the microcontroller, the inputs from the convenience sensors 34 and required function sensors 36 are processed according to a control program 47 contained in memory 29. The control program 47 may respond to the inputs from convenience sensors 32 and required function sensors 34 and its own control logic to actuate actuators 44. Additional output processing circuitry, for example buffer amplifiers 46, may be interposed along conductors 20 and 20' between the microcontroller 32 and the actuators 44.

The present invention also provides a voltage measure 48 input to the microcontroller 32 measuring a system voltage of the battery 38 as provided to the printed circuit board 12 by a conductor 20. This voltage measure 48 may be a multi-bit value provided by a dedicated analog to digital converter 50 (as shown) external or internal to the microcontroller 32 or may be a single bit indicating the result of a comparison of a voltage reference to the battery voltage. The battery voltage is also provided to the microcontroller 32 for powering the same but only after regulation, filtering and clamping provided by circuitry 51 well understood in the art. The voltage ultimately received by the microcontroller 32 for power is isolated and thus often unrelated to the system voltage.

The convenience sensors 34 and required function sensors 36 may receive the system voltage as measured by the voltage measure 48 and use it as a reference for their outputs as communicated to the microcontroller 34 or may use the system voltage as a reference for their input circuitry 40. A lowering of the system voltage either through lack of charging of battery 38 or high current demand from other devices such as the vehicle starter can therefore cause erroneously low output signals to the microcontroller 34 from convenience input circuits 40 or sensors 34. Generally, the required function sensors 36 are much more indifferent to the system voltage either by design of the sensor or by special preprocessing circuitry 41 not used with the convenience sensors 34.

Figure 3:
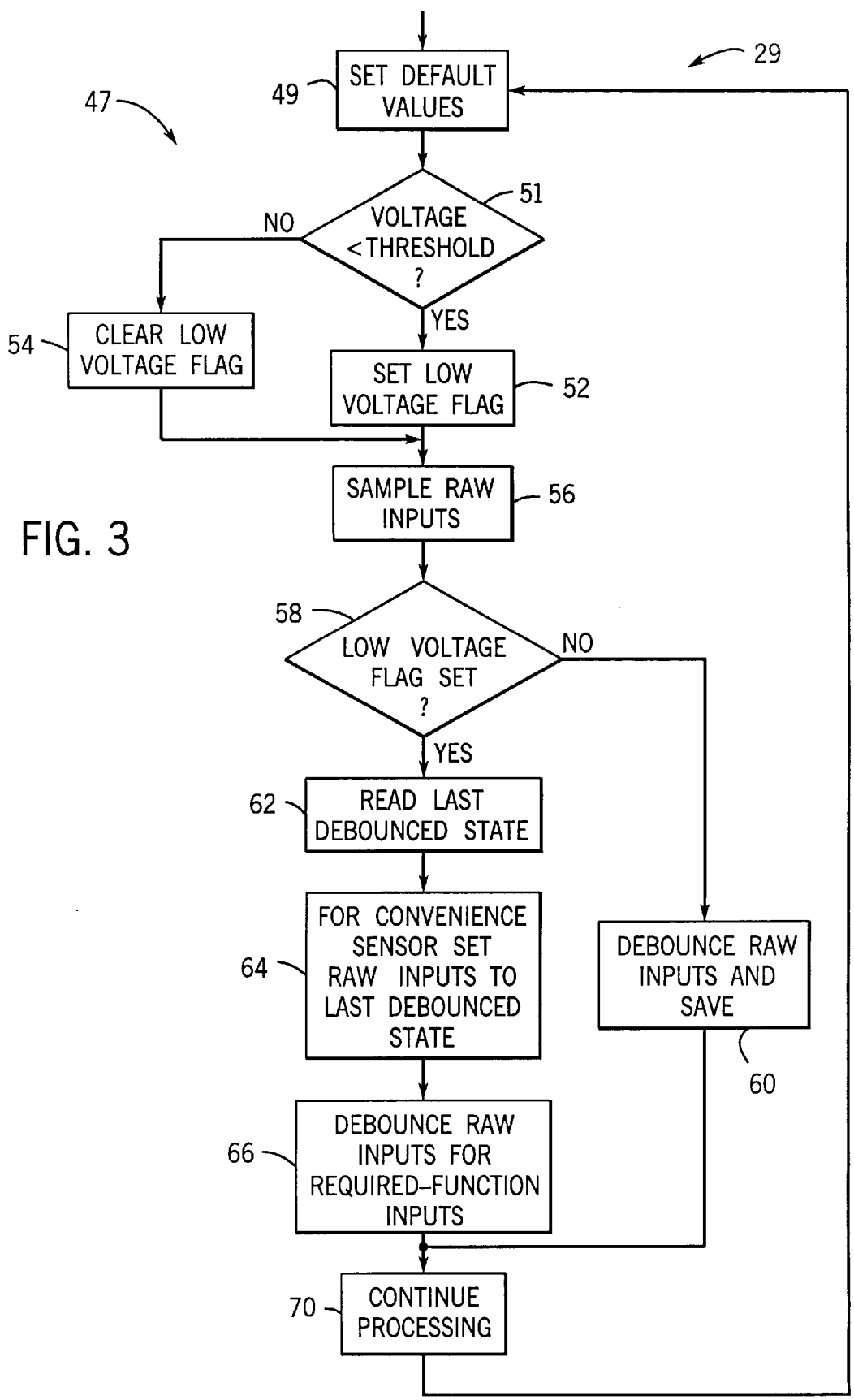
FIG. 3 is a flowchart of a program executed by the microcontroller of FIGS. 1 and 2 according to the present invention.

The present invention addresses the problem of erroneous states from input circuit 40 or erroneous output signals from the convenience sensors 34 by a modification of the control program 47 contained in memory 29. Referring now to FIG. 3, at an initial step of control program 47 indicated by process block 49, default values are placed in variables in memory 29 corresponding to each of the convenience sensors 34. These default values are selected generally so as to provide no alarm condition for gauges 22, chimes 24 or lamps 26, but may be any default value considered desirable under the anticipated circumstances in which a low system voltage will occur.

At a first decision block 51 of the control program 47, the voltage measure 48 is interrogated and the microcontroller 32 determines whether the system voltage to the various sensors 34 and 36 is above or below a predetermined threshold, typically nine volts. If the system voltage is below the threshold, then a low voltage flag is set indicated by process block 52. The low voltage flag consists of a bit in memory 29. Alternatively if the voltage is above the threshold, the low voltage flag is cleared at process block 54.

In either case, the control program 47 then proceeds to process block 56 where the inputs on conductors 20 from the convenience sensors 34 and required function sensors 36 are sampled. At succeeding decision block 58, the low voltage flag is interrogated and if it is not set, indicating that adequate voltage is being provided to the convenience sensors 34, the control program 47 proceeds to process block 60 and the input signals are debounced and stored. Debouncing involves obtaining successive samples of the inputs until a predetermined number of successive samples shows a consistent value and adopting that consistent value as the debounced input.

On the other hand if at decision block 58 the low voltage flag is set, indicating that the outputs from the convenience sensors 34 may be erroneous, then at succeeding process block 62, the last stored values for each of the convenience sensors 34 is read. Ideally, the last stored values are those values saved in process block 60 in a previous cycle of the control program 47. However, they may also be the default values established in process block 49 if no previous cycle of the program has occurred.

At succeeding process block 64, the inputs for the convenience sensors 34 are replaced with their last stored debounced values. As indicated by next process block 66 for the required function sensors 36, current debounced values of their signals are used under the assumption that the low system voltage does not affect these inputs for reasons described above.

At process block 70, the normal processing of the inputs from the convenience sensors 34 and the required function sensors 36, as modified above, are processed according to the normal operation of the control program. During conditions of normal system voltage, all inputs are debounced and used directly while in conditions of low system voltage, the last debounced inputs during a state of normal system voltage are used to replace the raw input values for the convenience sensors 34 only. The inputs from the required function sensors 36 which are used directly after debouncing.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. An integration hub processing automotive signals from signal sources receiving electrical power from an automotive power source, the integration hub comprising:

a plurality of sensor connections receiving the automotive signals;

at least one power connection receiving the electrical power from the automotive power source;

a voltage sensor communicating with the power connection to provide a measure of a voltage of the electrical power to the signal sources;

a processor communicating with the connections and having inputs receiving the automotive signals and the measure of the voltage and executing a stored program to:

(a) evaluate the measure of the voltage to determine whether the voltage is above a predetermined voltage threshold;

(b) when the measure of the voltage is above the predetermined threshold, employing the automotive signals for control functions and storing values of the automotive signals; and (c) when the measure of the voltage is not above the predetermined threshold, employing stored values of the previous automotive signals for the control functions.

2. The integration hub of claim 1 including further output devices selected from the group consisting of: electronic gauges, lamps and chimes and wherein the control functions control the actuation of the output devices as a function of the automotive signals.

3. The integration hub of claim 1 wherein the processor further executes the stored program to debounce the automotive signals when the measure of the voltage is above the predetermined threshold prior to using the automotive signals for control functions and storing values of the automotive signals.

4. The integration hub of claim 3 wherein the processor further executes the stored program to debounce the automotive signals by obtaining periodic samples of the automotive signals and testing for a predetermined number of successive samples of a consistent value.

5. The integration hub of claim 1 wherein the processor further executes the stored program to initialize stored values of the automotive signals to predetermined values.

6. The integration hub of claim 1 including further:

a plurality of required-function signal connections receiving required-function signals from required function signal sources;

wherein the processor further communicates with the required-function signal connections and executes the stored program to employ the required function automotive signals for control functions both when the measure of the voltage is above and below the predetermined threshold.

7. The integration hub of claim 1 wherein the predetermined voltage is substantially nine volts.

8. A method of integrating automotive signals from sources receiving electrical power from an automotive power source having variable voltage output, the method comprising the steps of:

(a) receiving automotive signals from a plurality of sources;

(b) measuring a voltage of the electrical power to the sources;

(c) comparing the measured voltage against a predetermined voltage threshold;

(d) when the measure of the voltage is above the predetermined threshold, employing the automotive signals for control functions and storing values of the automotive signals; and (e) when the measure of the voltage is not above the predetermined threshold, employing stored values of the previous automotive signals for the control functions.

9. The method of claim 8 wherein the step of employing the automotive signals for control functions actuates at least one of an electronic gauge, lamp and chime as a function of a automotive signal.

10. The method of claim 8 further including the step of debouncing the automotive signals when the measure of the voltage is above the predetermined threshold and prior to using the automotive signals for control functions and storing values of the automotive signals.

11. The method of claim 10 wherein the step of debouncing the automotive signals obtains periodic samples of the automotive signals and tests for a predetermined number of successive samples of a consistent value.

12. The method of claim 8 further including the step of initializing stored values of the automotive signals to predetermined values.

13. The method of claim 8 wherein the automotive sensors include a plurality of required-function sensors providing required-finctions automotive signals and including the step of employing the required function automotive signals for control functions both when the measure of the voltage is above and below the predetermined threshold.

14. The method of claim 8 wherein the predetermined voltage is substantially nine volts.

* * * * *